United States Patent

Radhamohan et al.

[11] Patent Number: 6,012,437
[45] Date of Patent: Jan. 11, 2000

[54] EGR SYSTEM WITH IMPROVED CONTROL LOGIC

[75] Inventors: Subbaraya Radhamohan, Novi; Mark Leonard, Canton; David Turner, Bloomfield Hills, all of Mich.

[73] Assignee: Eaton Corporation, Cleveland, Ohio

[21] Appl. No.: 09/110,165

[22] Filed: Jul. 6, 1998

[51] Int. Cl.[7] .............................. F01N 9/00; F02M 25/07
[52] U.S. Cl. ............................... 123/568.23; 251/129.11; 318/611
[58] Field of Search .................. 123/568.23, 568.24; 251/129.11; 318/611, 739

[56] References Cited

U.S. PATENT DOCUMENTS

| | | | |
|---|---|---|---|
| 3,915,134 | 10/1975 | Young et al. | 123/568.24 |
| 4,364,111 | 12/1982 | Jocz | 361/175 |
| 4,810,946 | 3/1989 | Sweeney, Jr. | 318/561 |
| 5,503,131 | 4/1996 | Ohuchi | 123/568.24 |
| 5,606,957 | 3/1997 | Feucht | 123/571 |
| 5,937,835 | 8/1998 | Turner et al. | 123/568.24 |

Primary Examiner—Tony M. Argenbright
Assistant Examiner—Arnold Castro
Attorney, Agent, or Firm—Charles E. Kosinski

[57] ABSTRACT

A control (60) for an EGR valve (24) including an actuator (16) for moving the EGR valve (24) between a closed position and an open position, and a position sensor (48) for detecting the position of the EGR valve (24) and generating a position output signal. A processing circuit (70,72) receives the position output signal and transmits electrical control signals to energize the actuator (16) and move the EGR valve (24). Control logic is implemented whereby, when the EGR valve (24) is moving towards the closed position, the processing circuit (70,72) transmits first electrical control signals for energizing the actuator (16) in a first predetermined manner when the position output signal indicates that the EGR valve (24) is at least a predetermined distance away from the closed position. When the position output signal indicates that the EGR valve (24) is less than the predetermined distance away from the closed position, the processing circuit (70,72) transmits second electrical control signals for energizing the actuator (16) in a second predetermined manner.

13 Claims, 5 Drawing Sheets

EGR SYSTEM WITH IMPROVED CONTROL LOGIC

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to an exhaust gas recirculation system for controlling the flow of exhaust gas from an exhaust gas passage to an engine intake passage of an internal combustion engine. More particularly, the present invention relates to control logic for an electrical actuator of such a system.

Exhaust gas recirculation (EGR) systems are employed in automotive vehicles in order to help reduce various engine emissions. Such systems typically employ a EGR valve that is disposed between the engine exhaust manifold and the engine intake manifold, and operable, when in an open position, to recirculate exhaust gas from the exhaust side of the engine back to the intake side.

An actuator is employed for moving the EGR valve between its open and closed positions, with the recirculation of exhaust gas being appropriate only at certain times. Typically, the appropriate time for recirculation is when the vehicle is traveling at lower speeds, when the pressure at the intake side of the engine is less than the pressure at the exhaust side of the engine.

Many prior art EGR systems employ air pressure as an actuator. However, in order to achieve more precise control, electrically-actuated EGR valves have also been introduced. One such electrically-actuated EGR valve is disclosed in pending U.S. application Ser. No. 881,622, filed Jun. 24, 1997, that is assigned to the present assignee, the disclosure of which is incorporated herein by reference.

Electrically-actuated EGR valve systems may employ software-implemented control logic which implements closed loop control. Such control logic controls current to an electric actuator motor which, in turn, positions the EGR valve. In such systems, the control logic may generate pulse width modulated (PWM) signals to power the actuator motor, and modulate the acceleration and deceleration of the EGR valve as it moves to its desired positions.

With respect to the closing of an electrically actuated EGR valve, prior art systems have implemented control logic that, once the valve is brought to a completely closed position (as detected by a valve position sensor), reduces the PWM signal to a nominal low value, resulting in a low holding current through the actuator motor for holding the valve in the closed position. This closing control logic has several disadvantages. First, when the valve is in the closed position and a low holding current (corresponding to a nominal PWM signal) is applied to the actuator motor, even moderate differential pressures across the valve can unseat the valve, causing a recirculation of exhaust gas at an improper time until the control logic senses the problem and increases the PWM signal to reseat the valve. Second, the prior art control logic does not take into account situations where the valve position sensor is in error. If the position sensor is out of adjustment, even by only a small amount, the sensor can improperly signal the control logic that full current is needed in order to close the valve when, in fact, the valve is already seated. This continuous application of full current when the valve is already seated creates a motor overcurrent condition that can ultimately result in motor failure.

BRIEF SUMMARY OF THE INVENTION

Accordingly, it is an object of the present invention to provide an improved electrically actuated EGR valve system and control logic that overcomes the disadvantages of the prior art systems.

It is a more specific object of the present invention to provide an electrically actuated EGR valve system that significantly reduces the possibility of motor overcurrent conditions due to a faulty valve position sensor reading.

It is a further object of the present invention to provide an electrically actuated EGR valve system that can hold the valve in the closed position under all possible differential pressure conditions.

The above and other objects of the invention are accomplished by the provision of a control for an EGR system including an actuator for moving the EGR valve between a closed position and an open position, and a position sensor for detecting the position of the EGR valve and generating a position output signal. A processing circuit receives the position output signal and transmits electrical control signals to energize the actuator and move the EGR valve. Control logic is implemented whereby, when the EGR valve is moving towards the closed position, the processing circuit transmits first electrical control signals for energizing the actuator in a first predetermined manner when the position output signal indicates that the EGR valve is at least a predetermined distance away from the closed position. When the position output signal indicates that the EGR valve is less than the predetermined distance away from the closed position, the processing circuit transmits second electrical control signals for energizing the actuator in a second predetermined manner. In the preferred embodiment, the second electrical control signals cause a predetermined mean steady state current to flow through the actuator that is sufficient to hold the EGR valve in the closed position under all possible differential pressure conditions.

DETAILED DESCRIPTION OF THE INVENTION

For purposes hereof, the term "closed loop control" is understood to generally refer to operation that involves constant feedback and modification of a control signal. The term "open loop control" is understood to generally refer to operation that does not involve constant feedback and modification of a control signal.

Figure 1:
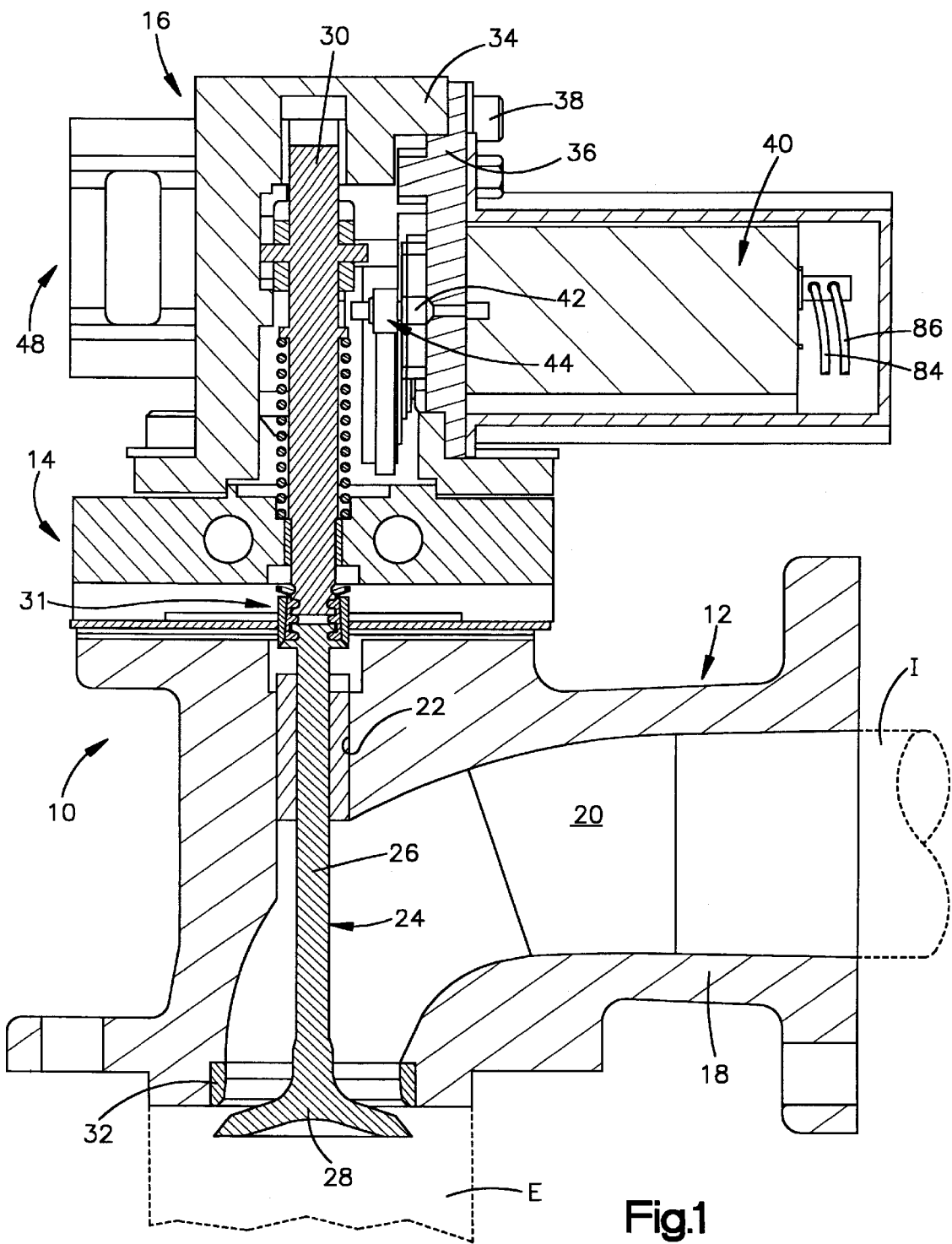
FIG. 1 is a transverse cross section of an exhaust gas recirculation valve and control system therefor.

Referring now to the drawings, which are not intended to limit the invention, FIG. 1 illustrates an electrically-actuated EGR valve system, generally designated 10. System 10 is an example of a preferred EGR valve system, the specifics of which are disclosed in pending U.S. patent application Ser. No. 881,622. Briefly, as is generally well known to those skilled in the art, EGR system 10 includes a manifold portion 12, a heat transfer (cooling) portion 14, and an actuator portion 16.

Manifold portion 12 includes a manifold housing 18 that defines a passage 20. At the upstream end of passage 20, manifold portion 12 is connected to an exhaust passage E, and, at the downstream end of passage 20, manifold portion 12 is connected to an intake passage I. Manifold housing 18 also defines a bore 22 within which a valve assembly, generally designated 24, is reciprocally supported for axial movement therein. Valve assembly 24 includes a valve stem 26 that is integrally formed with a poppet valve 28, and an input stem portion 30 that is coupled to valve stem 26 via a coupling arrangement 31 such that input stem portion 30 and valve stem 26 have common axial movement. Manifold housing 18 includes a valve seat 32 against which poppet valve 28 seats when valve assembly 24 is closed, such that valve seat 32 serves as the "close stop". However, in FIG. 1, valve assembly 24 is shown in an open position.

Actuator portion 16 includes an actuator housing 34 to which is attached a housing cover 36 by means of bolts 38 or any other suitable means. Attached to the exterior of housing cover 36 is the casing of an electric motor, generally designated 40. Although the particular construction and specifications of electric motor 40 are not essential to the present invention, motor 40 preferably is of the relatively high speed, continuously rotating type, and one with a high torque-to-inertia ratio, such as a permanent magnet DC commutator motor. As is described in greater detail below, control logic controls the functioning of electric motor 40 via electrical connections 84 and 86.

Electric motor 40 of actuator 16 provides a low torque, high speed rotary output at a motor output shaft 42 which drives a gear train generally designated 44. Gear train 44 translates the relatively low torque, high speed rotary output of motor 40 into a relatively high torque, low speed rotary output. The output of gear train 44 is then converted via linkage means, generally designated 46, into axial movement of input stem portion 30 and of the entire valve assembly 24.

Attached to actuator housing 34 is a sensor assembly, generally designated 48, the function of which is to sense the axial position of valve assembly 24. In a manner known to one of ordinary skill in the art and as generally described in U.S. patent application Ser. No. 881,622, position sensor 48 actually senses the angular position of a shaft which is representative of the angular position of a gear of gear train 44 which, in turn, is representative of the axial position of valve assembly 24 (and, thus, poppet valve 28). Sensor 48 converts the sensed position into an appropriate electrical signal that is transmitted as an input to control logic (described below) that controls the functioning of electric motor 40. In the preferred embodiment, sensor 48 is a resistive position sensor of the type typically used in the automotive industry for throttle position measurements.

Figure 2:
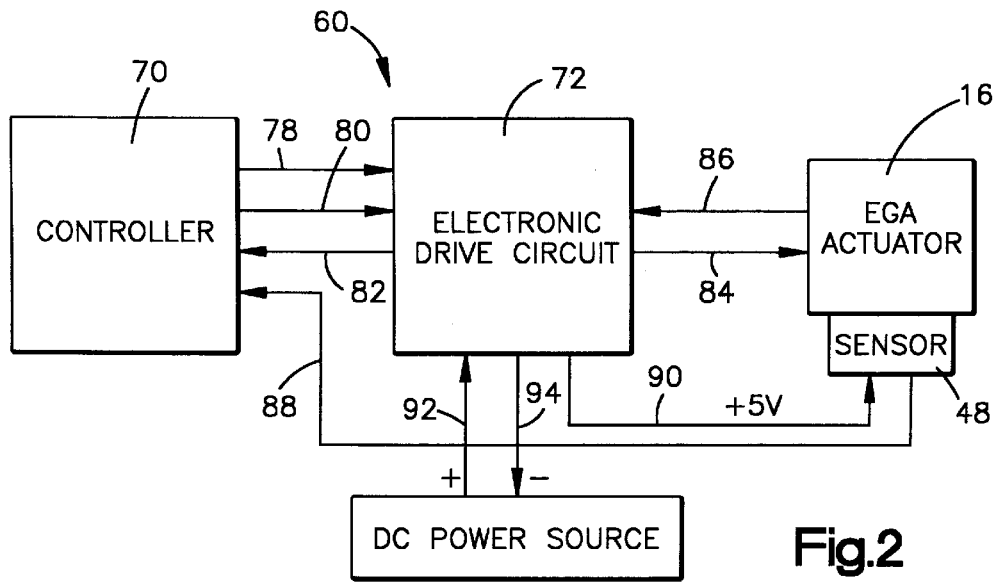
FIG. 2 is an electrical block diagram of an EGR system implementing the present invention.

Referring now to FIG. 2, shown is an electrical block diagram of a control 60 for EGR system 10. Shown is a controller 70, a drive circuit 72, actuator 16 (that includes electric motor 40), and sensor 48. In the preferred embodiment, controller 70 is a ruggedized microprocessor-based controller. Control logic for controller 70 controls the functioning of electric motor 40, and is described in greater detail below. Controller 70 and drive circuit 72 are electrically coupled via electrical connections 78, 80 and 82. Controller 70 provides a motor-actuating signal and a direction signal to drive circuit 72 via electrical connections 78 and 80, respectively. In the preferred embodiment, the motor-actuating signal is a PWM (Pulse Width Modulated) signal, the generalities of which are known to one of ordinary skill in the art, although other types of signals, such as analog signals, may be used. The direction signal indicates whether valve assembly 24 should be moved toward a closed position or an opened position, with either a clockwise or counter-clockwise rotation of motor 40 providing the appropriate axial movement thereof. Drive circuit 72 provides a current feedback signal to controller 70 via electrical connection 82. By means of this feedback signal, controller 70 can detect if overcurrent conditions are ever present in motor 40 so that power thereto can be discontinued. Via electrical connection 88, controller 70 receives a position signal from sensor 48 that is indicative of the axial position of valve assembly 24. In the preferred embodiment, controller 70 and drive circuit 72 are located within the engine compartment of the vehicle in close proximity to EGR valve system 10.

Drive circuit 72 receives inputs from controller 70 via electrical connections 78 and 80 and, in response thereto, drives motor 40 of actuator 16. Operating as a "power amplifier" with respect to the PWM signal of the preferred embodiment, drive circuit 72 supplies a bi-directional current to motor 40 via electrical connections 84 and 86. Drive circuit 72 receives power from power source 76 via electrical connections 92 and 94, and supplies +5 volt regulated DC operating voltage to position sensor 48 via electrical connection 90. A variety of satisfactory drive circuits are well known to those skilled in the art. Although the exact configuration is outside the scope of the present invention, a description of the preferred embodiment of drive circuit 72 is provided below for explanatory purposes only.

Figure 3:
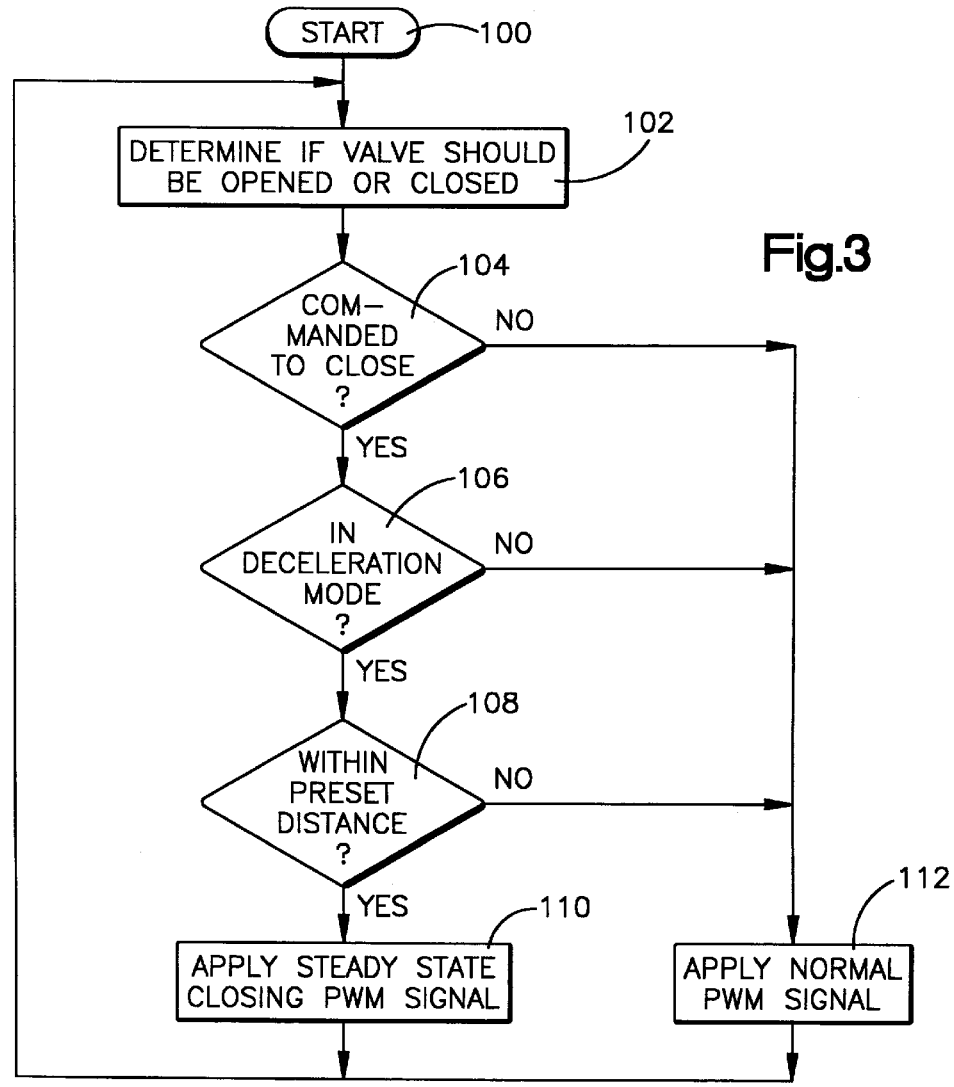
FIG. 3 is a flowchart for the control logic of the present invention.

Referring now to FIG. 3, shown is a flowchart of the control logic of a preferred embodiment of the present invention. This control logic is implemented in controller 70 and, via electrical connections 84 and 86, controls motor 40 and, thus, the position of valve assembly 24. The control logic begins at block 100 and proceeds, after any number of standard start-up operations (not shown), to block 102. The logic represented by block 102 determines if valve assembly 24 should be opened or closed (or left in its present position). This determination can be influenced by many factors, as is known to one of ordinary skill in the art, including the current speed of the vehicle. Typically, a look-up table is implemented in controller 70 in order to select an appropriate position for valve assembly 24, this position often being expressed in terms of a particular percentage of the fully opened position. The specifics of the determination made by block 102 are outside of the scope of the present invention and, therefore, are not discussed further herein.

Next, the control logic proceeds to block 104 which determines whether or not valve assembly 24 is currently being commanded to close (pursuant to block 102). If not ("NO"), the control logic proceeds to block 112 which causes a normal (typical) PWM signal to be applied to drive circuit 72 in accordance with methodologies generally known to those skilled in the art. After block 112, the control logic loops back to block 102 (discussed above). If block 104 determines that valve assembly 24 is currently being commanded to close ("YES"), then the control logic proceeds to block 106. Block 106 is included in the preferred embodiment in order to determine whether or not the closing of valve assembly 24 is in the deceleration mode. As further described below in connection with FIG. 4, controller 70, when operating in this mode, causes the current to motor 40 to be temporarily reversed (direction is changed) in order to reduce the speed of motion of the valve. If the valve is moving to the fully closed position, the deceleration mode prevents the valve from hitting valve seat 32 (FIG. 1) with too much force, thus preventing damage to the valve. If block 106 determines that the closing of valve assembly 24 is not in the deceleration mode ("NO"), then the control logic proceeds to block 112 (discussed above). If block 106 determines that the closing of valve assembly 24 is in a deceleration mode ("YES"), then the control logic proceeds to block 108 which determines whether or not poppet valve 28 of valve assembly 24 is within a preset distance of valve seat 32 (within a preset distance of being closed). This predetermined distance value is settable in controller 70, and is an engineering judgement based on the error tolerance values of sensor 48 and controller 70. By way of an example only, in an EGR system in which the sensor linearity tolerance is approximately +/−3% and the controller tolerance is approximately +/−0.02 millimeters, and where the range of motion between the totally closed and totally open positions of poppet valve 28 is approximately 8 millimeters, the predetermined distance value preferably is approximately 0.25 millimeters.

If block 108 determines that poppet valve 28 is not within the preset distance of valve seat 32 ("NO"), then the control logic proceeds to block 112 (discussed above). If block 108 determines that poppet valve 28 is within the preset distance ("YES"), then the control logic proceeds to block 110 which causes a lower, predetermined steady state PWM signal to be applied to drive circuit 72 in place of the normal PWM signal applied via block 112 (discussed above). In this manner, the control logic implements open loop control. The preset steady state PWM signal is established, preferably in the factory, such that it generates a predetermined mean steady state current that is sufficient to continue moving valve assembly 24 towards the closed position and to hold it closed under all expected differential pressure conditions in the vehicle's engine. By way of an example only, a 10–20% duty cycle is preferably used for the preset steady state PWM signal in order to generate a steady state, "hold closed" current preferably having a 2 Amp peak. This current is sufficient to hold valve assembly 24 in the closed position over an expected differential pressure range of approximately 1 to 25 psi. If selected properly, this steady state holding current is large enough to keep valve assembly 24 closed in the appropriate circumstances, yet small enough to not cause motor overcurrent conditions when continuously applied to keep valve assembly 24 closed. After block 110, the control logic loops back to block 102 (discussed above).

Figure 4A:
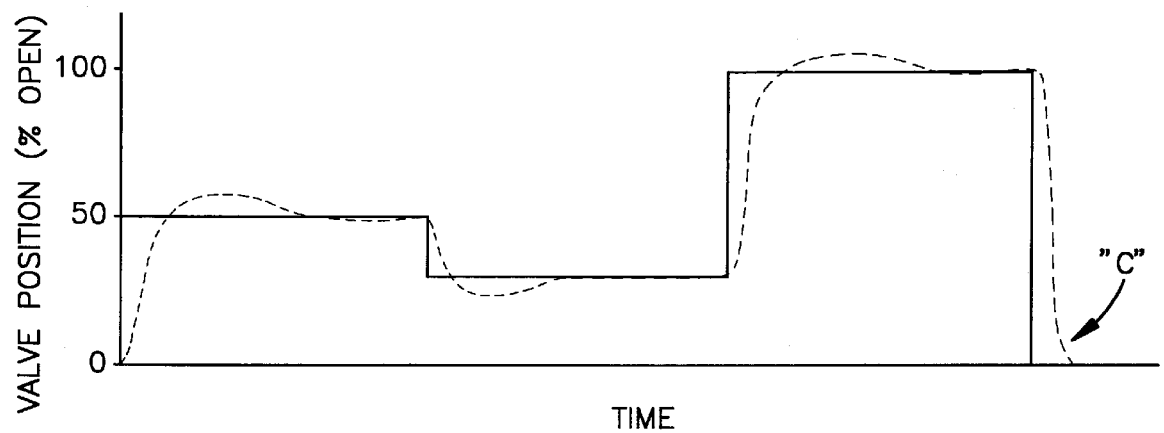
FIG. 4 consists of two graphs depicting an example sequence of EGR valve movements, and shows desired valve position, actual valve position, and current applied to the motor.
Figure 4B:
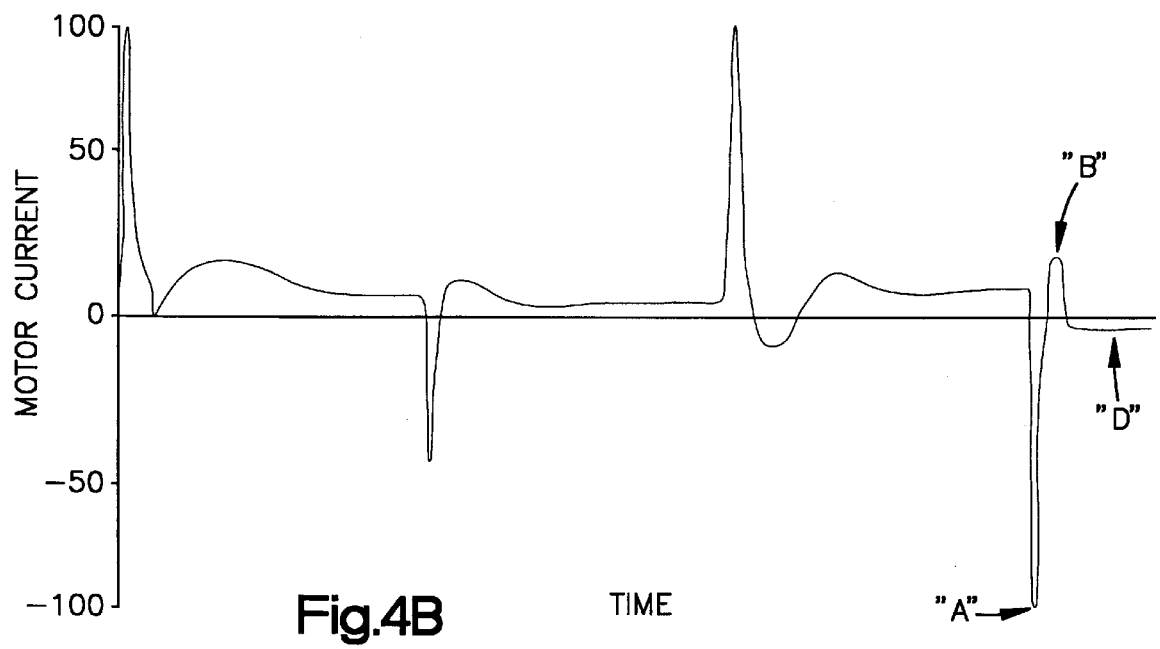

Referring now to FIG. 4, shown for explanatory purposes only are two graphs depicting an example sequence of movements of valve assembly 24 over a period of time. The top graph shows desired valve position (solid line) and actual valve position (dashed line) as a percentage of the fully opened position, and the bottom graph shows the corresponding current that is applied to motor 40. The actual valve position is shown to follow, or track, the desired valve position, with the actual valve position slightly overshooting the desired valve position upon each movement thereof (except for when the fully closed position is demanded). As shown in the bottom graph of FIG. 4, in order to reduce the speed of motion of valve assembly 24 and settle the valve into the proper position, a deceleration mode is implemented by controller 70 which typically causes current to motor 40 to be temporarily reversed (applied in the opposite direction of that applied to initially move valve assembly 24).

In the last valve movement sequence shown in FIG. 4 representing a move from the fully opened position (100%) to the fully closed position (0%), a large "negative" current (see "A") is temporarily applied in order to initiate the movement towards the closed position. As the closed position approaches, controller 70 shifts into its deceleration mode whereby a "positive" current (see "B") is applied in order to reduce the closing speed of valve assembly 24 and, thus, prevent the valve from hitting valve seat 32 (FIG. 1) with too much force. When valve assembly 24 has closed to within a preset distance of valve seat 32 (in the vicinity of "C"), the control logic of the present invention causes a lower, predetermined mean steady-state current (see "D") to be applied to motor 40 that is sufficient to continue moving valve assembly 24 towards the closed position and to hold it closed under all expected differential pressure conditions. In this manner, the control logic switches from closed loop control to open loop control.

Figure 5A:
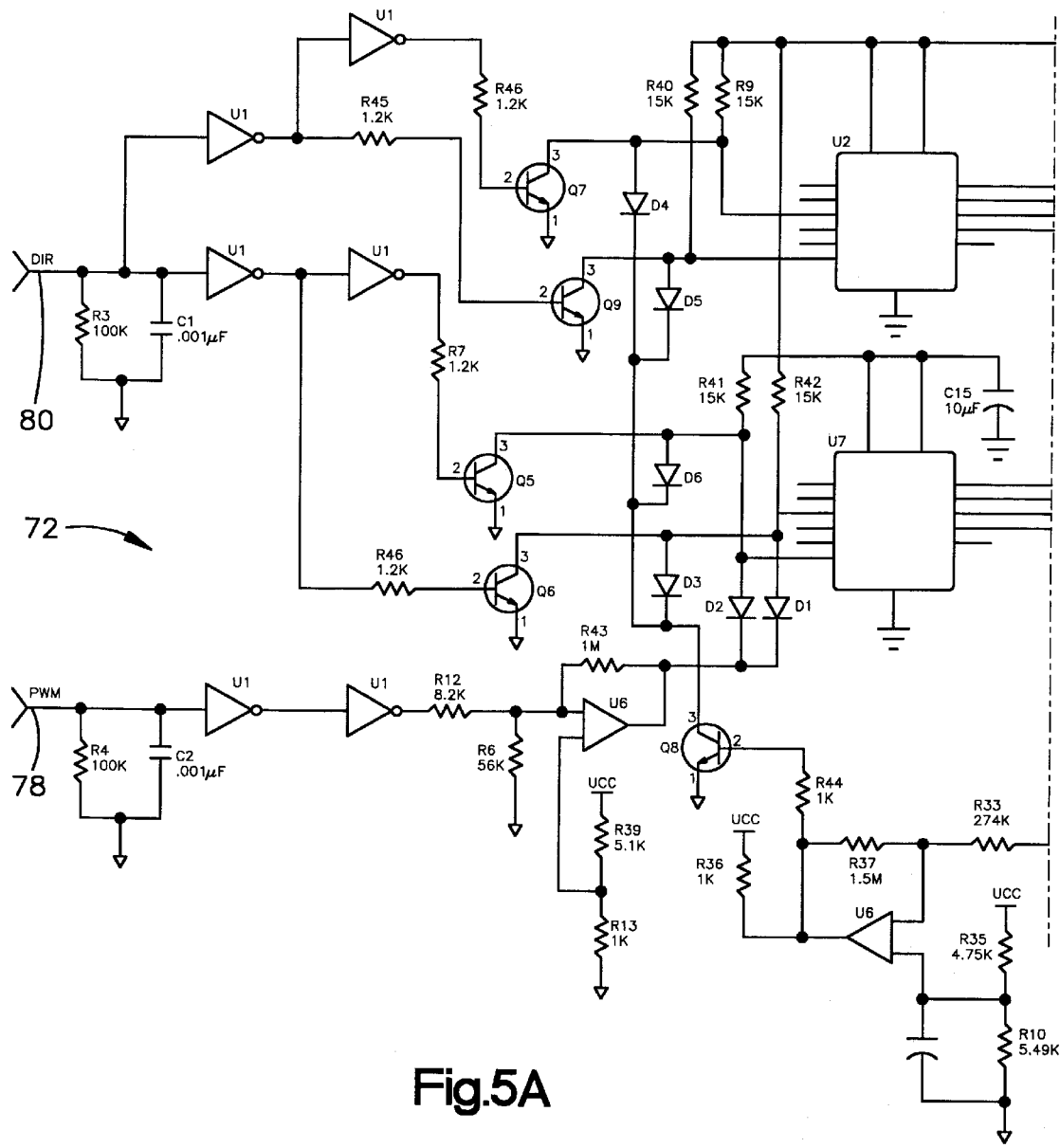
FIG. 5 is an electrical circuit diagram of a preferred drive circuit.
Figure 5B:
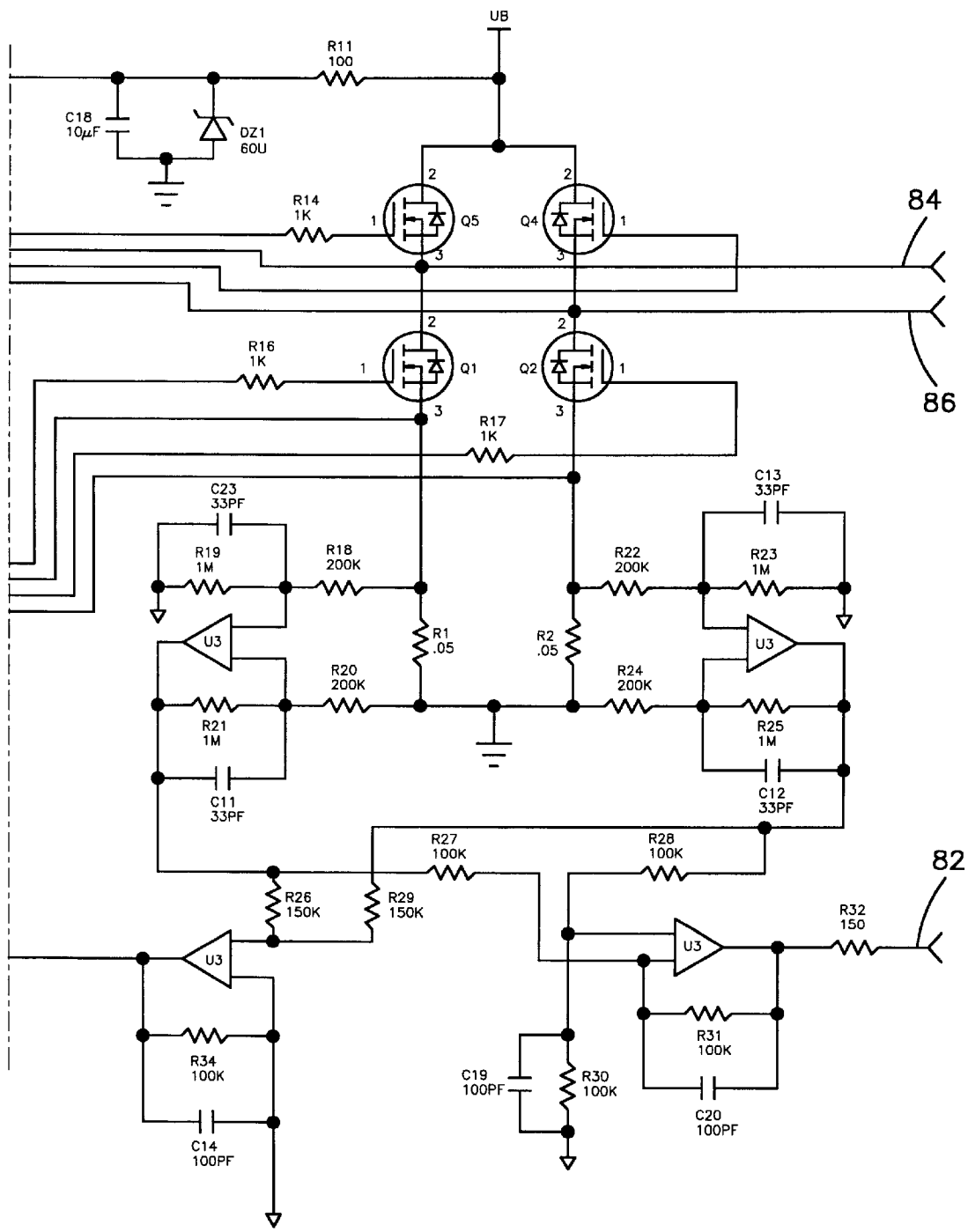

Referring now to FIG. 5, shown for explanatory purposes only is an electrical circuit diagram of a preferred embodiment of drive circuit 72. The components shown in FIG. 5 comprise an electronic assembly that is built on a printed wiring board and housed in an enclosure that is suitable for the environmental conditions that are experienced in a vehicle. The circuit is powered by a +12 volt DC power source that can typically be found in a vehicle. The component values of the preferred embodiment of drive circuit 72 are as shown in FIG. 5.

Briefly, FIG. 5 shows the motor-actuating input signal (PWM signal in the preferred embodiment) and the direction input signal which are received by drive circuit 72 from controller 70 via electrical connections 78 and 80, respectively. The motor-actuating signal is buffered by resistor R4, capacitor C2, and hex Schmidt trigger buffers U1. The direction signal is buffered by resistor R3, capacitor C1, and hex Schmidt trigger buffers U1. C2 and C1 act as low pass filters, resistors R4 and R3 hold the inputs to ground when the motor-actuating and direction signals are inactive, and buffers U1 provide buffered inverted outputs.

Motor control transistors Q7, Q9, Q5, and Q6 of FIG. 4 control the direction of motor rotation, and determine which pair of diagonally orientated power MOSFETS in the H-bridge output stage (Q1, Q2, Q3, and Q4) are on at any instant. Resistors R46, R45, R7, and R8 limit the base current to these transistors. Resistors R14, R15, R16, and R17 are gate resistors that slow down the switching time of the MOSFETS and help limit electromagnetic interference. Integrated circuits U2 and U7 are dual, charge pump type MOSFET drivers, with resistors R40, R9, R41, and R42 serving as pull-ups for the inputs of U2 and U7. Because the transistors in each pair of motor control transistors Q7, Q9 and Q5,Q6 are always in opposite states, only one gate drive output of U2 or U7 will be active at any give time. This action controls the direction of current through motor 40. In response to a logic high signal at one of the inputs of U2 or U7, the corresponding gate output is "pumped up" to approximately 15 volts above its source connection, thus ensuring that the MOSFET switches into full conduction. Capacitors C18 and C15 provide bulk capacitance that is required when U2 and U7 are "pumping up" the gate voltage.

The motor-actuating input signal via electrical connection 78 determines the rate and duration of on-time for the lower MOSFETS Q1 and Q2. The buffered signal is sent to one stage of dual comparator U6, with R12, R6, R43, R39, and R13 establishing a threshold shifting network whereby small voltage differences at the inputs of U6 will not cause oscillation. D1 and D2 gate the motor-actuating signal with the direction signal, thereby causing only one of the lower MOSFETS Q1 and Q2 to be switched on and off in response to the motor-actuating signal.

Drive circuit 72 of FIG. 5 also includes current sense circuitry. One portion of this circuitry measures the currents in the two lower legs of the MOSFET H-bridge, sums these two currents, and provides the sum to an internal current limiter Q8. R1, R18, R20, R19, R21, C11, C23, and one stage of a quad op-amp U3 form one current sense amplifier, and R2, R22, R24, R23, R25, C12, C13, and another stage of op-amp U3 form a second current sense amplifier. These amplifiers have a DC gain of five. The amplified signals are summed through R26 and R29 at a third stage of op-amp U3. The summed motor current is compared by another stage of comparator U6 to a reference voltage created via resistors R35 and R10, with resistors R33, R37, and R36 providing hystersis for U6. If the summed motor current is high enough (greater than 10 amps in the preferred embodiment), the resulting limit signal operates transistor Q8 through resistor R44. Such operation pulls all inputs of U2 and U7 to ground, through diodes D3, D4, D5, and D6, which turns off the H-bridge. In this manner, the current limiter circuitry limits peak motor current to 10 amps in the preferred embodiment. Once the motor current falls back below 10 amps, the limiter shuts off, and normal circuit operation resumes.

FIG. 5 also includes current sense circuitry that provides the current feedback signal to controller 70 via electrical connection 82. This circuitry includes R27, R28, R30, R31, C19, C20, and another stage of an op-amp U3, with a resulting DC gain of one.

As mentioned above, position sensor 48 is a resistive position sensor in the preferred embodiment. However, other types of position sensors may be used in place thereof. In one embodiment, the determination of valve position can be accomplished by monitoring the current through motor 40. As the EGR valve moves through a complete cycle between its open and closed positions, a unique current versus time signature can be observed. A map of valve position versus current can then be obtained and stored in controller 70 for use by the control logic thereof. After receiving a present current signal via current sensing circuitry such as that found in drive circuit 72, controller 70 compares the current signal with the stored map in order to determine actual valve position.

In another embodiment, the determination of valve position can be accomplished by monitoring the velocity of the valve with a conventional velocity sensor positioned in close proximity to the valve. Pursuant to this method, the polarity of the velocity measurement (moving towards the closed position or moving towards the open position) is monitored, and a reference or "zero" position is established that corresponds to a fully closed or fully open position. When the valve is in the reference or "zero" position, a switch or similar triggering device is activated in order to indicate such position to controller 70. By measuring velocity versus time, the distance that the valve has traveled can be calculated. In conjunction with the monitoring of polarity and the reference or "zero" position, this distance measurement enables valve position to be determined.

The present invention provides an EGR valve system capable of keeping an EGR valve closed under all expected differential pressure conditions in a vehicle's engine, thereby allowing a recirculation of exhaust gas only at the proper times. By providing the equivalent of a "buffer zone", the present invention also significantly reduces the possibility of motor overcurrent conditions due to a faulty valve position sensor reading. If, when the EGR valve is closed, the position sensor is out of adjustment within the expected error tolerance value, then the position sensor signal, although inaccurate, will indicate that the EGR valve is still less than the predetermined distance away from the closed position. As a result, instead of full current, a predetermined steady state current will continue to be applied that is incapable of causing motor overcurrent conditions.

For purposes of the claims, it is to be understood that "first electrical control signals" and "first predetermined manner" as used therein refer to closed loop control operation in which actuator current is variable.

The invention has been described in great detail in the foregoing specification, and it is believed that various alterations and modifications of the invention may become apparent to those skilled in the art from a reading and understanding of the specification. It is intended that all such alterations and modifications are included in the invention, insofar as they come within the scope of the appended claims.

We claim:

1. A control (60) for an exhaust gas recirculation (EGR) valve (24) comprising:
   an actuator (16) for moving the EGR valve (24) between a closed position and an open position;
   a position sensor (48) for detecting the position of the EGR valve (24) and generating a position output signal;
   a processing circuit (70,72) coupled to said actuator (16) and said position sensor (48), said processing circuit (70,72) receiving said position output signal and transmitting electrical control signals to said actuator (16) for energizing said actuator (16) and moving the EGR valve (24); and
   wherein, when the EGR valve (24) is moving towards the closed position, said processing circuit (70,72) transmitting first electrical control signals for energizing said actuator (16) in a first predetermined manner when said position output signal indicates that the EGR valve (24) is at least a predetermined distance away from the closed position, said processing circuit (70,72) transmitting second electrical control signals for energizing said actuator (16) in a second predetermined manner when said position output signal indicates that the EGR valve (24) is less than said predetermined distance away from the closed position.

2. The control (60) of claim 1 wherein said processing circuit (70,72) includes a microprocessor that generates pulse width modulated (PWM) signals.

3. The control (60) of claim 1 wherein said second electrical control signals cause less current to flow through said actuator (16) than said first electrical control signals.

4. The control (60) of claim 1 wherein said second electrical control signals cause a predetermined mean steady state current to flow through said actuator (16) that is sufficient to hold the EGR valve (24) in the closed position under differential pressure conditions.

5. The control (60) of claim 1 wherein said predetermined distance is approximately one-fourth millimeter.

6. The control (60) of claim 1 wherein said position sensor (48) is comprised of a resistive position sensor.

7. The control of claim 1 wherein said position sensor (48) determines valve position by monitoring the current through said actuator.

8. The control of claim 1 wherein said position sensor (48) is comprised of a velocity sensor.

9. The control (60) of claim 1 wherein said first predetermined manner is closed loop control and said second predetermined manner is open loop control.

10. The control (60) of claim 9 wherein said processing circuit (70, 72) implements a deceleration mode when said closed loop control transitions to said open loop control.

11. A control (60) for an exhaust gas recirculation (EGR) valve (24) comprising:

- a means (16) for moving the EGR valve (24) between a closed position and an open position;
- a means (48) for detecting the position of the EGR valve (24) and generating a position output signal;
- a means for processing (70,72) coupled to said moving means (16) and said detecting means (48), said processing means (70,72) receiving said position output signal and transmitting electrical control signals to said moving means (16) for moving the EGR valve (24); and
- wherein, when the EGR valve (24) is moving towards the closed position, said processing means (70,72) transmitting first electrical control signals for energizing said moving means (16) in a first predetermined manner when said position output signal indicates that the EGR valve (24) is at least a predetermined distance away from the closed position, said processing means (70,72) transmitting second electrical control signals for energizing said moving means (16) in a second predetermined manner when said position output signal indicates that the EGR valve (24) is less than said predetermined distance away from the closed position.

12. A method for controlling the actuator (16) of an exhaust gas recirculation (EGR) valve (24), comprising the steps of:

- detecting the position of the EGR valve (24);
- detecting if the EGR valve (24) is moving towards the closed position;
- energizing the actuator (16) in a first predetermined manner if the EGR valve (24) is moving towards the closed position and is at least a predetermined distance away therefrom; and
- energizing the actuator (16) in a second predetermined manner if the EGR valve (24) is moving towards the closed position and is less than said predetermined distance away therefrom.

13. A control (60) for an exhaust gas recirculation (EGR) valve (24) comprising:

- an actuator (16) for moving the EGR valve (24) between a closed position and an open position;
- a position sensor (48) for detecting the position of the EGR valve (24) and generating a position output signal;
- a processing circuit (70,72) coupled to said actuator (16) and said position sensor (48), said processing circuit (70,72) receiving said position output signal and transmitting electrical control signals to said actuator (16) for energizing said actuator (16) and moving the EGR valve (24); and
- wherein, when the EGR valve (24) is moving towards the closed position, said processing circuit (70,72) transmitting first electrical control signals for energizing said actuator (16) in closed loop control operation when said position output signal indicates that the EGR valve (24) is at least a predetermined distance away from the closed position, said processing circuit (70,72) transmitting second electrical control signals for energizing said actuator (16) in open loop control operation when said position output signal indicates that the EGR valve (24) is less than said predetermined distance away from the closed position.

* * * * *